No. 810,207. PATENTED JAN. 16, 1906.
W. H. HODGES.
POULTRY COOP.
APPLICATION FILED DEC. 19, 1904.
3 SHEETS—SHEET 1.
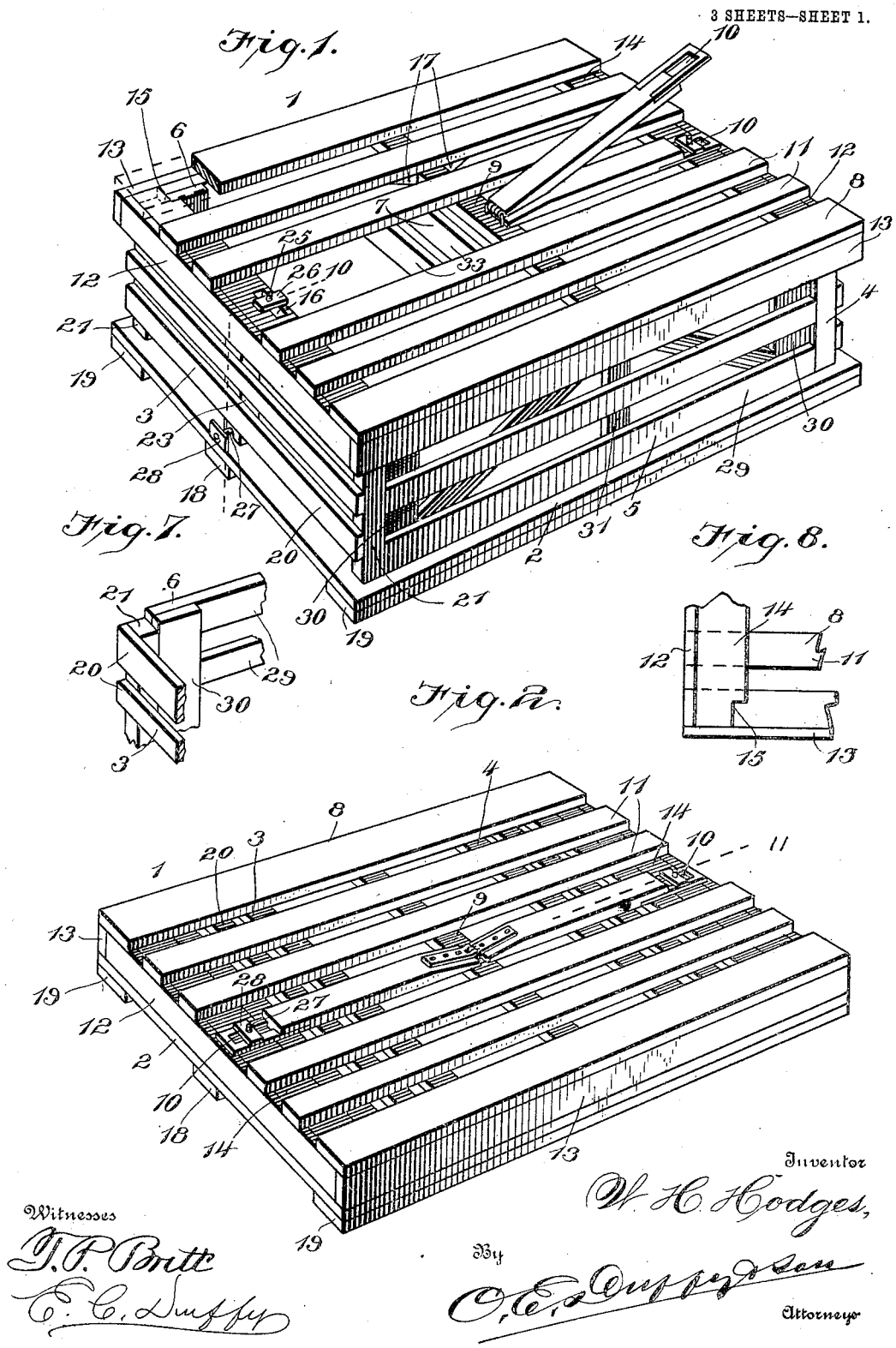
Witnesses
J. P. Britt
E. C. Duffy
Inventor
W. H. Hodges,
By
C. E. Duffy & Son
Attorney

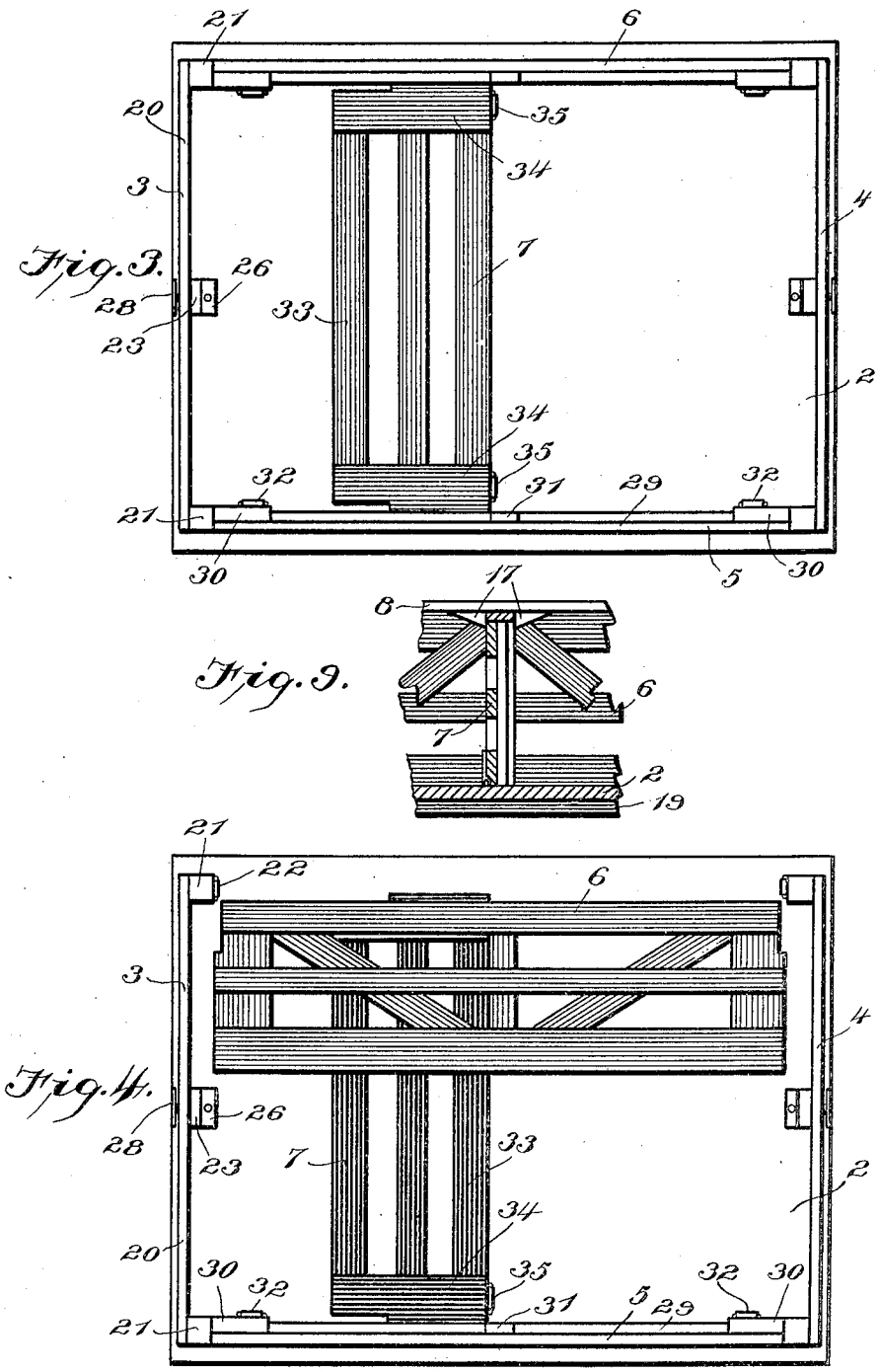

No. 810,207. PATENTED JAN. 16, 1906.
W. H. HODGES.
POULTRY COOP.
APPLICATION FILED DEC. 19, 1904.
3 SHEETS—SHEET 3.
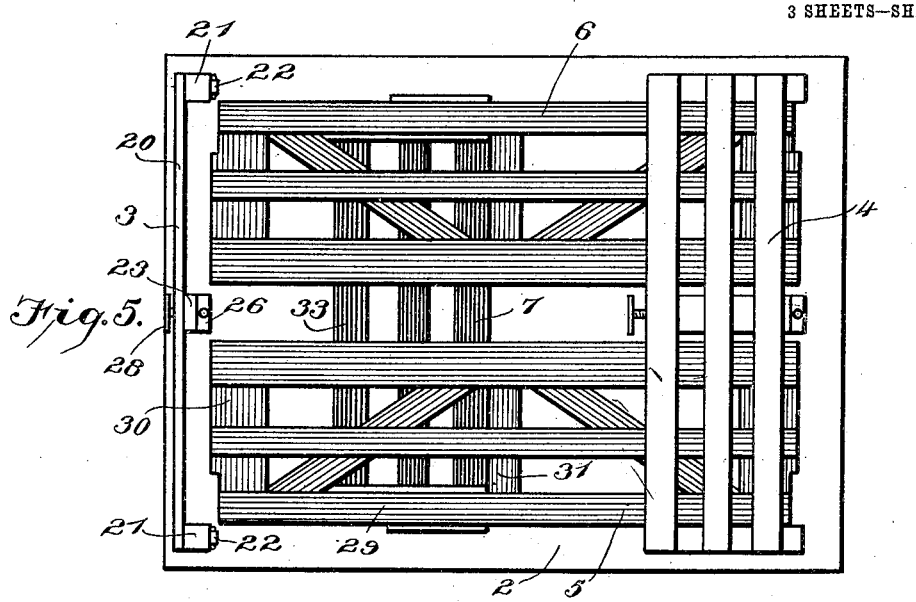
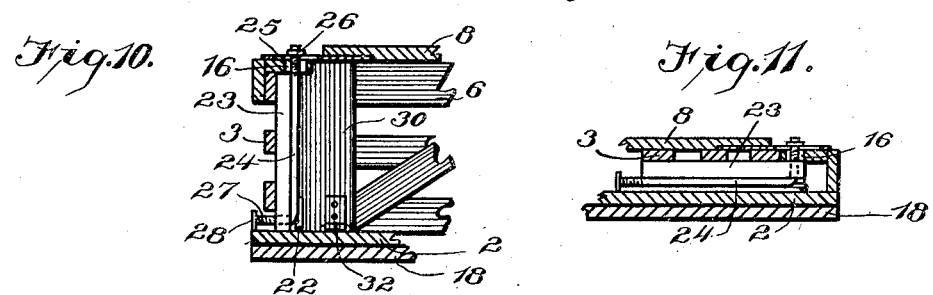
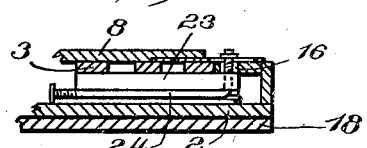
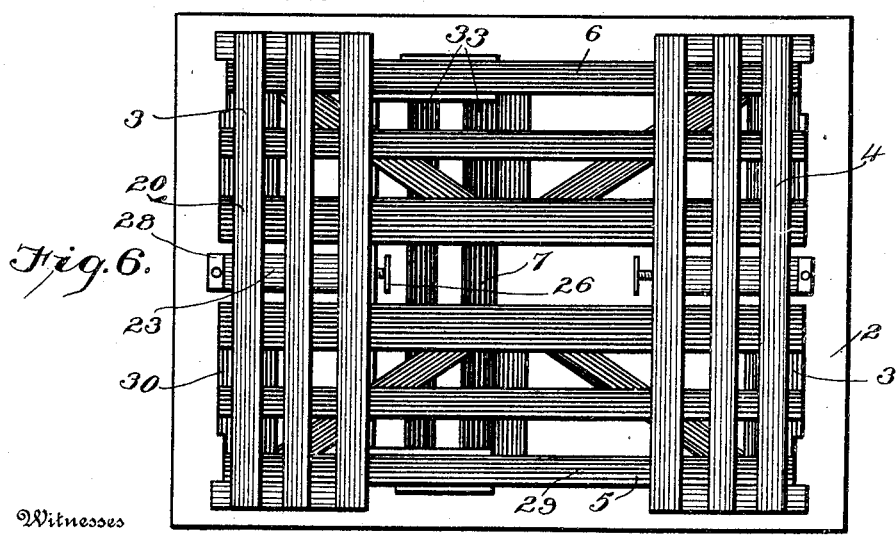

UNITED STATES PATENT OFFICE.

WILLIAM HENRY HODGES, OF UNION STAR, MISSOURI.

POULTRY-COOP.

No. 810,207.     Specification of Letters Patent.     Patented Jan. 16, 1906.

Application filed December 19, 1904. Serial No. 237,532.

*To all whom it may concern:*

Be it known that I, WILLIAM HENRY HODGES, a citizen of the United States, residing at Union Star, in the county of Dekalb and State of Missouri, have invented certain new and useful Improvements in Poultry-Coops; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to poultry-coops, and has for its object to provide a device of this class which can be knocked down when empty and made to occupy the least possible space.

A further object of my invention is to provide a knockdown poultry coop or crate which can be set up in the shortest space of time and which is extremely simple in its construction, easy and cheap to manufacture, strong, durable, and efficient.

With these objects in view my invention consists in the novel construction providing for holding the coop in an open position and for holding the coop in a closed or knockdown position.

My invention further consists in certain other novel details of construction and in combinations of parts, which will be first fully described and afterward specifically pointed out in the appended claims.

A knockdown poultry coop or crate in order to be thoroughly practical must have a minimum amount of fastening and must require a very short space of time in order to set it up or knock it down, and I have therefore constructed this poultry-coop so that the coop, including the ends, sides, and central partition, is held in an open position for use by the top of the coop, and the coop is so constructed that the ends, sides, and central partition are held in a knockdown or collapsed position by the top of the coop, and it is in the construction providing for this that my invention particularly consists.

Referring to the accompanying drawings, Figure 1 is a perspective view of the poultry-coop in position for receiving poultry. Fig. 2 is a perspective view of the coop in a collapsed or knockdown position. Fig. 3 is a top plan view showing coop with top removed and central partition folded down against the bottom of the coop. Fig. 4 is a similar view showing the central partition and one side of the coop folded down against the bottom. Fig. 5 is a similar view showing the central partition, both sides, and one end folded down against the bottom of the coop. Fig. 6 is a plan view showing the central partition, both sides, and both ends folded down against the bottom of the coop; and Fig. 7 is a fragmentary perspective view showing one of the upper corners of the coop formed by the end and side. Fig. 8 is an inside plan of one corner of the cover or top of the coop. Fig. 9 is a fragmentary longitudinal sectional view of the central portion of the coop, showing the central partition and top. Fig. 10 is a fragmentary longitudinal sectional view taken through line 10 10 of Fig. 1. Fig. 11 is a longitudinal sectional view taken on line 11 11 of Fig. 2.

Like numerals of reference indicate the same parts throughout the several figures, in which—

1 indicates the coop, which comprises the bottom 2, ends 3 and 4, sides 5 and 6, central partition 7, and top or cover 8. Referring particularly to Fig. 1, it will be seen that the central slat of the top or cover 8 is hinged to the transverse brace 9, so as to allow the throwing back of the slat to form a door for the poultry, and it will be seen from Fig. 1 that the said central slat is provided at each end with a longitudinal slot 10. The said top is constructed of a series of longitudinal slats 11 and is also provided with vertical ends 12 and vertical side pieces 13, the slats 11 and the ends 12 being supported by transverse horizontal end braces 14. By referring to Fig. 8 it will be seen that the ends of said braces 14 are provided with a notch 15 for a purpose which will be hereinafter fully described. Said braces 14 are also provided with a transverse slot 16, as shown in Fig. 1, and the slats 11 of the top are provided with holding-blocks 17, as shown in Figs. 1 and 9.

The bottom 2 of the coop is constructed solid and is provided with a central longitudinal stiffening-piece 18 and a longitudinal side stiffening-piece 19 at both sides of the bottom.

The ends 3 of the coop are provided with transverse horizontal slats 20, which are secured to end posts 21, which end posts are hinged to the bottom by hinges 22, as shown in Fig. 10, a vertical central post 23 being also provided for said ends, and secured to said central post 23 in any convenient manner is the rod 24, which has a threaded upper end 25 to accommodate a turn-button 26. The lower end of said rod 24 is bent outwardly at right angles, as shown in Fig. 10, the extreme end 27 thereof being threaded to accommodate a turn-button 28.

The sides of the coop are made up of longitudinal horizontal slats 29, which are secured to end posts 30 and to a central stiffening-post 31, as shown in Fig. 1, the end posts 30 extending a short distance above the end posts 21 of the ends 3, as shown in Fig. 7, said sides being hinged to the bottom 2 by hinges 32, as shown in Fig. 10, so that said sides may be folded down on the bottom of the coop, as shown in Fig. 6.

The central partition 7 is made up of a series of transverse horizontal slats 33, secured to vertical end pieces 34, as shown in Fig. 4, said end pieces being hinged to the bottom 2 by hinges 35, as also shown in Fig. 4.

Having thus described the several parts of my invention, its operation is as follows: Referring to Fig. 1, which illustrates the coop in an operative position, it will be seen that the transverse horizontal braces 14, which support the longitudinal slats 11 of the top, are provided with a transverse slot 16, and it will be seen that the rod 24, Fig. 10, which is carried on the ends 3, is shown extending through the said slot 16, the turn-button 26 being shown as turned longitudinally across the transverse slot 16. In the section of the movable slat which is shown fastened it will be seen that the turn-button 26 is located transversely over the longitudinal slot 10 in said slat. In order to unfasten the slat to put poultry into the coop or remove same therefrom, the turn-button 26 is turned longitudinally, so as to pass through the longitudinal slot 10 in the movable slat. When both turn-buttons have been turned longitudinally, the top 8 is removed by simply lifting the same from the coop.

It will be noted by referring to Figs. 7 and 8 that the transverse brace 14 of the top is provided with a notch 15, and referring to Fig. 7 it will be noted that the vertical post 30 of the side 6 is somewhat higher than the post 21 of the end 3. When the top is in position on the coop, the post 30 of the side 6 and the highest slat of said side fits into the notch 15 in the transverse brace 14 of the top 6, securely holding the side in a vertical position, the vertical end and side pieces 12 and 13 of the top extending down over the outside of the ends and sides of the coop 6, securely holding the ends and sides in a vertical and upright position and preventing them from becoming accidentally collapsed.

It will be seen by referring to Figs. 1 and 9 that the holding-blocks 17, which are secured to the slats of the top, straddle the central division 7 when the top is in position, thus securely holding said division in a vertical and upright position.

When the top is removed, by operating the turn-button 26 in order to make them coincide with the transverse slots 16 in the top the coop is collapsed or knocked down by first turning the central division down upon the bottom, as shown in Fig. 3. The sides 5 and 6 are then folded down over the central division and on the bottom, as shown in Figs. 4 and 5, and the ends 3 and 4 are then folded down over the sides 5 and 6, as shown in Fig. 6. When, however, the ends 3 and 4 are in a collapsed or folded position, the short threaded end 27 of the rod 24, Fig. 10, is in a vertical position, as shown in Fig. 11. The top or cover 8 is then placed over the collapsed coop, the turn-buttons 28 passing through the transverse slots 16 in the top or cover 8. The turn-buttons are then turned longitudinally. The movable central slat of the top or cover is passed down so that the said turn-buttons 28 pass through the longitudinal slot 10 in said movable slats, and the said turn-buttons are then turned transversely, as shown in Fig. 2, thus securely locking the entire coop in a folded or collapsed position.

In order to again place the coop in position for holding the poultry, the operation just recited is reversed and the coop is set up into position shown in Fig. 1.

Having thus described the several parts of my invention, I do not wish to be understood as limiting myself to the exact construction as herein set forth, as various slight changes may be made therein which would fall within the limit and scope of my invention, and I consider myself clearly entitled to all such changes and modifications.

What I claim as my invention, and desire to secure by Letters Patent of the United States, is—

1. In a knockdown coop or crate the combination of the bottom, ends and sides constructed to fold over said bottom, said sides and ends being so arranged that when they are in an upright position the sides are between the ends and support said ends in said upright position, a top for said coop or crate, a transverse brace on said top, said brace being constructed to engage said sides to hold the same in an upright position, substantially as described.

2. In a knockdown coop or crate, the combination of a bottom, folding ends and sides thereon, a top for said coop or crate, means on the upper edge of said ends for holding the said top in position when said coop is in an upright position, and means carried on the side of said ends for engaging said top to hold the same in position when said coop is in a knockdown or collapsed position, said engaging means on the side of said ends being brought into position for engaging said top when said ends are folded, substantially as described.

3. In a folding coop or crate, the combination of a bottom, end and side pieces thereon, a turn-button on the upper edge of said end pieces, a turn-button on the side of said end pieces, a cover or top adapted to be passed over said end and side pieces and adapted to be engaged by said turn-button on the upper edge of said end pieces when the coop is in an upright and open position, said top or cover being also adapted to be engaged by the turn-button on the side of said end pieces when the coop is in a folded or collapsed position, said turn-button on the side of said ends being brought into position to engage the said top when said sides are folded down substantially as described and for the purposes set forth.

In testimony whereof I affix my signature in presence of two witnesses.

WILLIAM HENRY HODGES.

Witnesses:
W. T. WHETSELL,
T. O. THOMPSON.